Feb. 16, 1937. H. N. WILLIAMS 2,070,703
WHIP ROLL BEARING
Filed Feb. 4, 1935 2 Sheets-Sheet 1
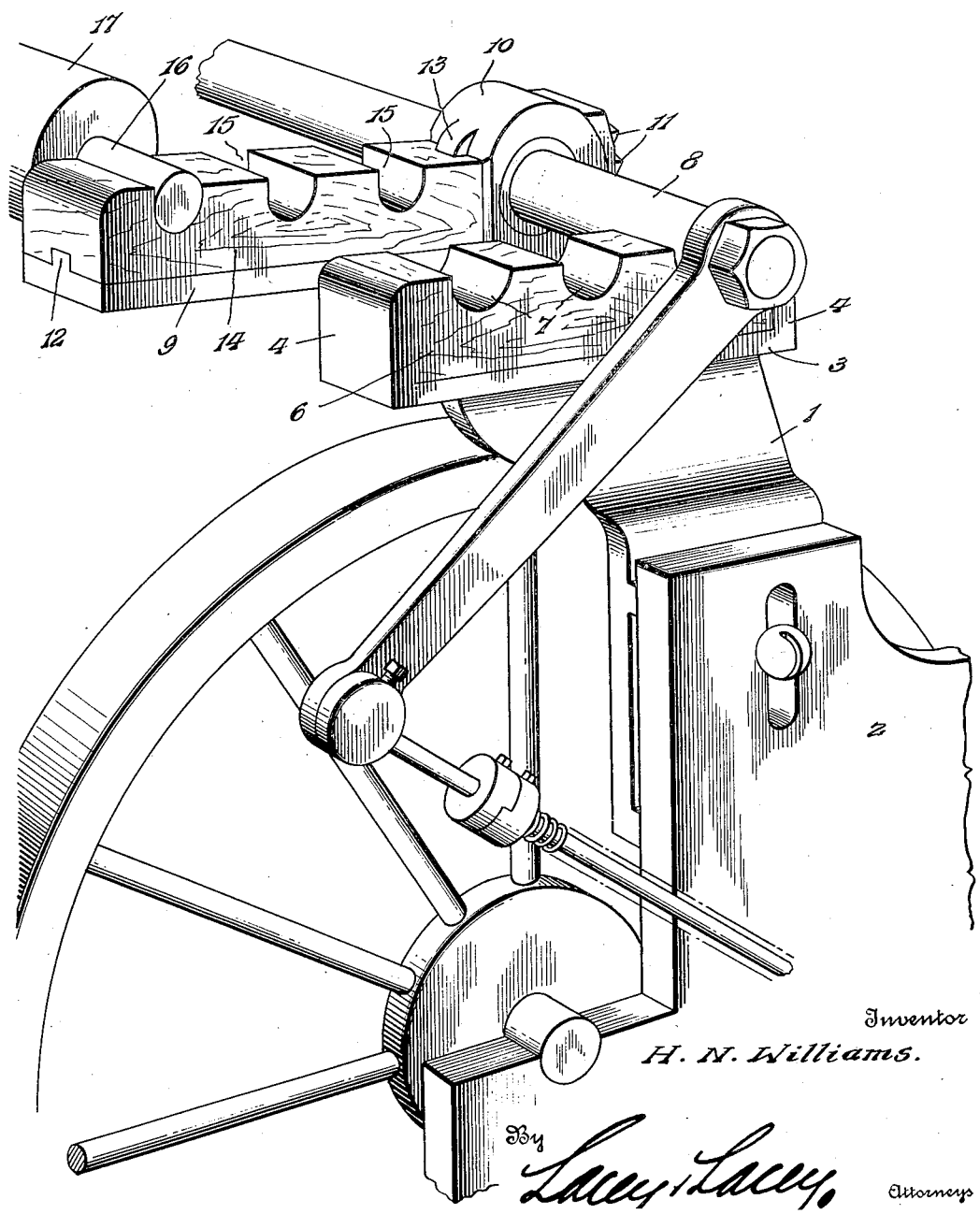

Feb. 16, 1937.   H. N. WILLIAMS   2,070,703
WHIP ROLL BEARING
Filed Feb. 4, 1935   2 Sheets-Sheet 2
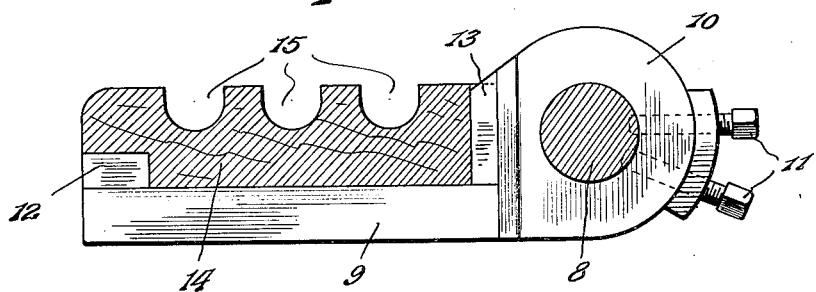
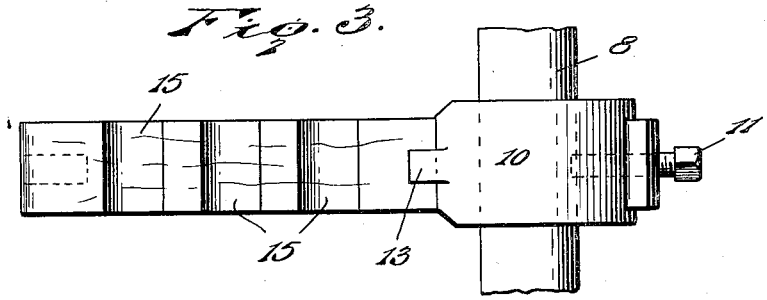
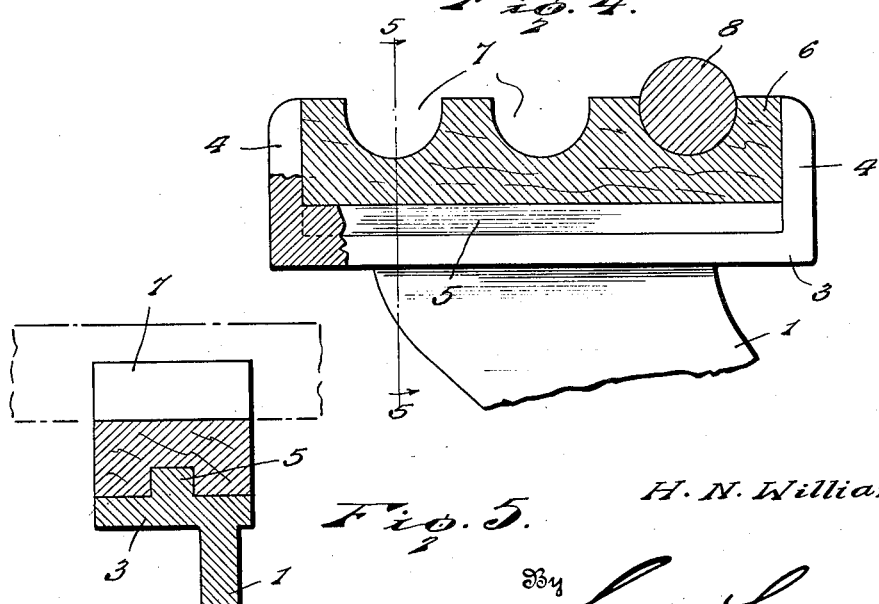
Inventor
H. N. Williams.
By Lacey & Lacey, Attorneys Patented Feb. 16, 1937

2,070,703

UNITED STATES PATENT OFFICE 2,070,703

WHIP ROLL BEARING

Hiram N. Williams, Huntsville, Ala., assignor of one-half to Fred Eugene Lambert, West Huntsville, Alabama Application February 4, 1935, Serial No. 4,936

1 Claim. (Cl. 308—22)

This invention relates to whip rolls of looms and has special reference to means for mounting the whip roll, the object of the invention being to provide bearings for the whip roll and the whip roll shaft of such characteristics that oil will not be apt to find its way onto the cloth being woven, and the bearings will be effectually held against displacement from the brackets on which they are mounted, although they may be readily removed when repair or renewal is necessary. The several objects of the invention are attained in such a device as is illustrated in the accompanying drawings, and the invention resides in certain novel features which will hereinafter be first fully described and then more specifically defined in the appended claim.

In the drawings:

Figure 1 is a perspective view of a portion of a loom showing my improved bearings in proper position.

Figure 2 is a view, partly in elevation and partly in longitudinal section, of the whip roll arm.

Figure 3 is a plan view of the same.

Figure 4 is a view, partly in longitudinal section and partly in elevation, of the whip roll shaft bearing.

Figure 5 is a section on the line 5—5 of Figure 4.

In the practice of the present invention, there are provided brackets 1 which are secured to the loom frame, a portion of which is shown at 2, it being understood that the brackets are formed in rights and lefts, and a bracket is provided at each side of the loom. At the upper end of the bracket, preferably integral therewith, is a bearing arm or holder 3 having upstanding flanges 4 at its ends. The bearing arm is also provided with a rib 5 on its upper surface extending longitudinally thereof between the flanges 4, as clearly shown in Figures 4 and 5. The bearing block 6 is formed of wood and provided with a plurality of notches or journal seats 7 in its upper side, cut across the grain, in any one of which the shaft 8 may be engaged. The wooden bearing block 6 is impregnated with oil or other lubricant so that the shaft 8 will be lubricated sufficiently to operate easily at all times and the presence of loose oils or other lubricants will be obviated so that there will be no excessive lubricant overflowing from the bearings to find its way onto the cloth and damage the same.

The shaft may be mounted in any one of the seats 7 according to the nature of the cloth being woven or other circumstances in any given instance. At the inner side of the bearing arm 3 and the bearing block 6 a whip roll arm 9 is secured upon the shaft, said arm being provided at one end with an integral eye or hub 10 through which the shaft is inserted and in which it is secured by set screws 11, in the usual manner. At the free end of the arm 9, a lug 12 is formed on its upper side and this lug is preferably of angular cross section, as clearly shown in Figure 1. A vertically extending rib 13 of angular cross section is formed on the side of the eye or hub 10 facing the lug 12 and a wooden bearing block 14 is carried by the arm 9, said block being provided at its opposite ends with grooves engaging the lug 12 and the rib 13, respectively, so that the block will be held in proper position upon the arm. This block 14 is provided with notches or seats 15 in its upper side, cut across the grain, in any one of which the whip roll journal 16 may be engaged. The block 14, like the block 6, is impregnated with oil or other lubricant so that the journal of the whip roll will be thoroughly lubricated for easy rotation without requiring an excessive quantity of lubricant which would tend to leak from the bearing and find its way onto the cloth.

The whip roll 17 may be set according to the demands of any given circumstances by engaging its journals in any one of the seats 15, as will be understood, and it may be lifted at will from any one seat and engaged in another seat as the demands of the weaving may dictate. It will be noted that the structure is exceedingly simple and no nails, screws or other pointed fasteners are required to secure the bearing blocks in their respective supports. When in place, each block will be firmly held against displacement by reason of the interengaging projections and grooves or recesses, but if a block should become badly worn so that renewal will be necessitated, or should, for any other reason, removal of the block be desirable, all that needs to be done is to displace the whip roll or the whip roll shaft, as the case may be, and then merely lift the bearing block from its supports. A new block may be just as easily inserted in the support.

Having thus described the invention, I claim:

A device of the character described comprising a hub bored to receive a shaft and having a flat inner end face, means for securing said hub in a fixed position upon the shaft, an arm extending from the flat inner end face of said hub and having a flat upper face, a lug carried by the free end portion of said arm and disposed intermediate the width of the upper face thereof with its outer end flush with the end of the arm, a rib rising from the upper face of said arm against the flat inner end face of said hub and disposed intermediate the width of the arm in opposed relation to said lug, and a bearing block resting upon the upper face of said arm and having its inner end face abutting the flat end face of the hub and recessed to form a seat receiving said rib, the under face of the bearing block being recessed from its outer end to form a seat receiving said lug, and the upper face of the bearing block being formed with transversely extending recesses spaced from each other longitudinally of the block and constituting seats adapted to rotatably receive a journal of a roller.

HIRAM N. WILLIAMS.